(12) United States Patent
Kamijoh et al.

(10) Patent No.: US 11,080,545 B2
(45) Date of Patent: Aug. 3, 2021

(54) OPTICAL CHARACTER RECOGNITION SUPPORT SYSTEM

(71) Applicant: INTERNATIONAL BUSINESS MACHINES CORPORATION, Armonk, NY (US)

(72) Inventors: Kohichi Kamijoh, Tokyo (JP); Akira Shimizu, Kanagawa (JP); Dai Sakai, Kawasaki (JP); Yuta Ishii, Tokyo (JP)

(73) Assignee: International Business Machines Corporation, Amronk, NY (US)

( * ) Notice: Subject to any disclaimer, the term of this patent is extended or adjusted under 35 U.S.C. 154(b) by 279 days.

(21) Appl. No.: 16/394,216

(22) Filed: Apr. 25, 2019

(65) Prior Publication Data

US 2020/0342249 A1   Oct. 29, 2020

(51) Int. Cl.
*G06K 9/00* (2006.01)
*G06K 9/34* (2006.01)
*G06K 9/40* (2006.01)
*G06K 9/62* (2006.01)

(52) U.S. Cl.
CPC ......... *G06K 9/346* (2013.01); *G06K 9/00469* (2013.01); *G06K 9/40* (2013.01); *G06K 9/6215* (2013.01); *G06K 9/6262* (2013.01); *G06K 2209/01* (2013.01)

(58) Field of Classification Search
CPC ...... G06K 9/346; G06K 9/00469; G06K 9/40; G06K 9/6215; G06K 9/6262; G06K 2209/01
See application file for complete search history.

(56) References Cited

U.S. PATENT DOCUMENTS

| 5,694,494 A * | 12/1997 | Hart ........................ G06K 9/346 382/175 |
| 7,551,778 B2 * | 6/2009 | Miyatake ........... G06K 9/00449 382/163 |
| 7,630,572 B2 * | 12/2009 | Ashikaga ............... G06K 9/346 358/3.26 |
| 2016/0019430 A1 | 1/2016 | Stella |
| 2016/0092412 A1 | 3/2016 | Seki et al. |
| 2018/0225274 A1 | 8/2018 | Tommy et al. |

FOREIGN PATENT DOCUMENTS

CN            107305630 A        10/2017

* cited by examiner

*Primary Examiner* — Shefali D Goradia
(74) *Attorney, Agent, or Firm* — Tutunjian & Bitetto, P.C.; Randall Bluestone

(57) ABSTRACT

A computer-implemented method for increasing a recognition rate of an optical character recognition (OCR) system is provided. The method includes preprocessing by receiving an image, and extracting all vertical lines from the image. The method includes adding vertical lines at character areas of the image, extracting all horizontal lines from the image, and creating an unlined image removing all the vertical/horizontal lines from the image. The method further includes determining a border of a vertical direction of the unlined image based on the total of pixels of rows in each column, and adding vertical/horizontal auxiliary lines between characters of the unlined image. The method also includes postprocessing by receiving garbled words of OCR output, removing noise after morphologically analyzing, replacing garbled letters with correct ones based on a frequent edit operation, and outputting the correct word, weighting results of image distance calculations based on machine learning.

18 Claims, 14 Drawing Sheets

1600

ANA Cargo and Mail Business Results

| (Fiscal Year) | | 2016 | YoY(%) | |
|---|---|---:|---|---|
| Cargo and Mail Service Revenues (¥ Billions) | | 132.4 | +19.3 | ←M1 |
| International cargo | ATK (Millions) | 6,583 | +3.4 | ←M2 |
| | RTK (Millions) | 4,150 | +7.8 | ←M3 |
| | Cargo volume (Thousand tons) | 954 | +4.3 | ←M4 |
| | Cargo revenues (¥ Billions) | 93.3 | +26.5 | ←M5 |
| | Unit price (¥/kg) | 98 | +21.3 | ←M6 |
| | Mail revenues (¥ Billions) | 4.8 | +22.0 | ←M7 |
| Domestic cargo | ATK (Millions) | 1,783 | -2.5 | ←M8 |
| | RTK (Millions) | 459 | -2.5 | ←M9 |
| | Cargo volume (Thousand tons) | 451 | -3.2 | ←M10 |
| | Cargo revenues (¥ Billions) | 30.8 | -0.5 | ←M11 |
| | Unit price (¥/kg) | 68 | +2.8 | ←M12 |
| | Mail revenues (¥ Billions) | 3.4 | -0.8 | ←M13 |

OPTICAL CHARACTER RECOGNITION SUPPORT SYSTEM

BACKGROUND

The present invention generally relates to optical character recognition (OCR) systems, and more particularly to improving recognition rate of an OCR system.

Electronic OCR is the electronic conversion of images of text (for example, typed, handwritten or printed, etc.) into machine-encoded text. The images can be provided from a scanned document, a photo of a document, a scene-photo (for example, the text on signs and billboards in a landscape photo), subtitle text superimposed on an image, etc. OCR systems first recognize the layout (for example, recognize an area for words and numbers), and then extract the words and numbers. OCR systems can be evaluated based on their performance regarding layout, word, and/or number recognition.

SUMMARY

In accordance with an embodiment of the present invention, a method for increasing a recognition rate of an optical character recognition (OCR) system is provided. The method includes receiving an image, and extracting all vertical lines from the image. The method includes adding vertical lines at character areas of the image, and extracting all horizontal lines from the image. The method includes creating an unlined image removing all the vertical lines and horizontal lines from the image. The method further includes determining, by the processor device, a border of a vertical direction of the unlined image based on the total of pixels of rows in each column, and adding vertical auxiliary lines in blank space between characters of the unlined image.

In accordance with an embodiment of the present invention, a method for increasing a recognition rate of an optical character recognition (OCR) system includes receiving garbled words of OCR output, removing noise after morphologically analyzing the garbled words, and replacing garbled letters with correct ones based on a frequent edit operation. The method also includes determining a distance between the at least one garbled word and each of a plurality of candidate correct words, and selecting one of the plurality of candidate correct words as correct word using a score based on the distance.

In accordance with an embodiment of the present invention, a system for increasing a recognition rate of an optical character recognition (OCR) system is provided. The system includes a memory device for storing program code, and at least one processor device operatively coupled to the memory device and configured to execute program code stored on the memory device to receive at least one image, and extract all vertical lines from the at least one image. The program code adds vertical lines at character areas of the at least one image, and extracts all horizontal lines from the at least one image. The at least one processor device executes the program code to create an unlined image removing all the vertical lines and horizontal lines from the at least one image, and determine a border of a vertical direction of the unlined image based on the total of pixels of rows in each column. The program code also adds vertical auxiliary lines in blank space between characters of the unlined image.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 16 illustrates a pre-processing table including word areas.

DETAILED DESCRIPTION

Embodiments of the present invention relate generally to systems and methods for learning in optical character recognition (OCR) support systems. Systems and methods in accordance with present embodiments increase recognition rate of OCR systems, with respect to word and number pairs (of garbled and corrected words) by adding auxiliary lines blank space between words or numbers of a sheet image outputted by OCR system. The systems apply processes that adapt to (for example, the strengths and weaknesses of) each OCR engine, making the best of each OCR engine based, for example, on a combination of pre-processing and post-processing of the particular OCR engine. The systems improve the correct words/numbers recognition rate.

The systems can receive an output that the OCR system recognizes and measures an edit (for example, Levenshtein) distance between the word of the output and a candidate correct word. The systems superimpose letters of each word, and check image distance between the word of the output and the candidate correct word. The systems can define weights of edit (for example, Levenshtein) distance process and the image distance process using past piles of word pairs.

Exemplary applications/uses to which the present invention can be applied include, but are not limited to applying pre-process to an input image to the OCR, and improving recognition rate of the OCR based on layout (and/or words, numbers, etc.). The present invention can also be applied to post-process an output image from the OCR, and to swap garbled words with correct ones.

Figure 1:
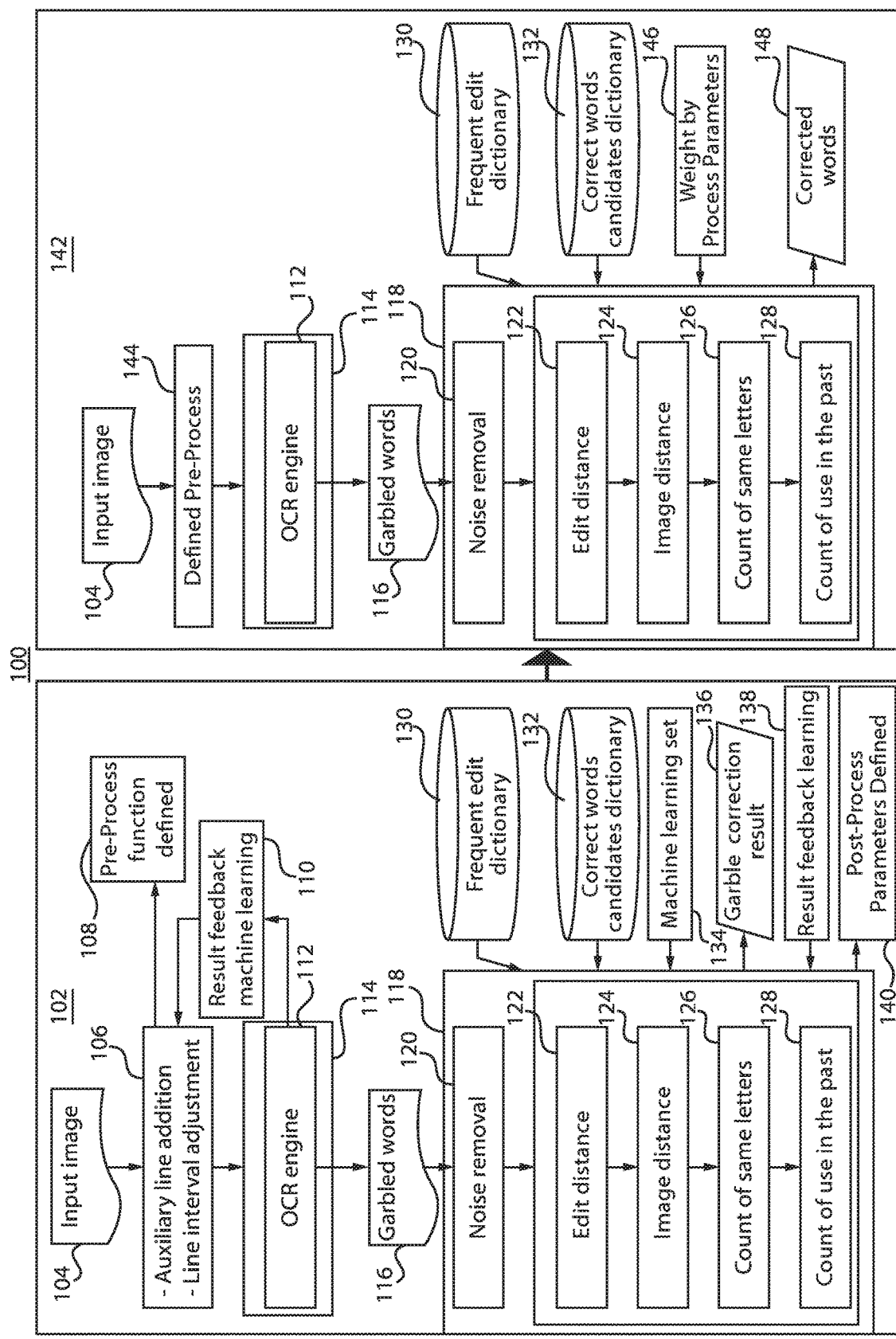
FIG. 1 is a block/flow diagram showing an optical character recognition (OCR) support system, in accordance with an embodiment of the present invention.

Referring now to the drawings in which like numerals represent the same or similar elements and initially to FIG. 1, a block/flow diagram showing an optical character recognition (OCR) support system 100 is illustrated, in accordance with an embodiment of the present invention.

The OCR support system 100 can be applied to support (for example, existing, separate, stand alone, etc.) OCR engines to leverage processes that fit each OCR engine, making the best of each OCR engine, and finally to improve the correct words/numbers recognition rate. The OCR support system 100 save costs as compared to systems that separately develop the layout, word, and/or number recognition engine (which can be almost as costly as developing a new OCR engine).

OCR support system 100 can be implemented at a learning phase 102 and an operation phase 142. In the learning phase 102, OCR support system 100 defines processes and parameters and implements feedback and learning to prepare the OCR support system 100 for the operation phase 142. In the operation phase 142, OCR support system 100 receives input scan(ned) image(s) 104 and outputs corrected words 148.

OCR support system 100 applies pre-processing to the input image 104 to the OCR support system 100 (that is to be input to the OCR engine 112), and improves layout/words/numbers recognition rate of the OCR engine 112. A correct layout recognition improves the correct rate of words/numbers.

OCR support system 100 applies post-processing to the output image from the OCR engine 112, and swaps garbled words 116 (included in the output image, not shown separately) with corrected words 148.

During the learning phase 102, in both the pre-processing of the input image 104 to the OCR engine 112 and post-processing of the output image from the OCR engine 112, OCR support system 100 initially identifies processes that are expected to be effective, finds a best combination/order of processes with corresponding weights and determines a machine learning (ML) set (for example, (garble words, correct words) list). At runtime, during the operations phase 142, OCR support system 100 performs pre-processing and post-processing using the (for example, determined) ML set (e.g., the result from learning phase 102).

According to an example embodiment, pre-processing can include enlarging spaces between lines and adding auxiliary lines between lines.

According to an example embodiment, post-processing can include initially removing noise. In detail, OCR support system 100, as described with respect to FIG. 8 herein below, inversely converts a garbled word 116 based on frequent edit operation (e.g., a graphically/visually similar but incorrect figure/character sequence, such as "I," is converted to "I", and "In" is converted to "1n"), and, as described further with respect to FIG. 9 herein below, after morphologically analyzing garbled word 116 and all of the candidate of the correct words, excludes all of the morphemes not included in any morpheme of candidate correct words from the garbled word. OCR support system 100 can perform post-processing procedures (as described below in the subsequent paragraph) for each of the garbled words 116 (after inversely converting the garbled word, morphologically analyzing the garbled word), and the original garbled word, calculating scores, and outputting the word with highest score as the correct word.

The post-processing procedures can include edit (for example, Levenshtein) distance, determining image distance (for example, cosine distance regarding letters as binary images), determining a number of same characters (for example, letters), and determining a number of candidate words used in the past, all between the garbled word and the candidate for the correct word. Although particular post-processing procedures are described, it should be understood that additional or different post-processing procedures can be applied by OCR support system 100.

Referring now in detail to FIG. 1, particularly to the learning phase 102, OCR support system 100 receives an input scan image 104 and performs auxiliary line addition and line interval adjustment 106 (such as described herein below with respect to FIGS. 2 to 7. OCR support system 100 defines one or more pre-Process function(s) 108. OCR support system 100 outputs images to (for example, a separate system 114 that includes) OCR engine 112 and, via result feedback, machine learning 110, can determine adjustments to the pre-processing function.

OCR engine 112 outputs garbled words 116 to post-process 118.

Post-process 118 includes noise removal 120, edit distance 122, image distance 124, count of same letters (or characters) 126, and count of use in the past 128. Post-process 118 uses (for example, incorporates) information from frequent edit dictionary 130, correct words candidates dictionary (and used count, for example, 30,000 words) 132 and machine learning set 134 (for example, garbled word, correct word). Post-process 118 also uses result feedback learning 138 to determine garble correction result 136 (for example, a correct interpretation of a garbled word) and defined post-process parameters 140.

Referring once more in detail to FIG. 1, particularly now to the operation phase 142, OCR support system 100 receives an input scan image 104. OCR support system 100 performs a defined pre-process (function) 144 on the input image 104. The OCR engine 112 performs an OCR process on the pre-processed image and outputs results, which can include garbled words 116.

OCR support system 100 performs post-process 118 on the garbled words 116, including noise removal 120, edit distance 122, image distance 124, count of same letters (or characters) 126, and count of use in the past 128. Post-process 118 uses information from frequent edit dictionary 130, correct words candidates dictionary (and used count, for example, 30,000 words) 132. Post-process 118 also uses weight by post-process parameters 146 to determine corrected words 148.

The OCR support system 100 has been proven to be effective in improving the performance of OCR engines. For example, by applying the post-process 118 from the OCR support system 100 to the output of an OCR engine, the correct (word, number) recognition ratio was improved from 53% to 81%, using 800 balance sheet/profit and loss statement (BS/PL) forms. By applying pre-process, such as auxiliary line addition and line interval adjustment 106, 75% of layouts were correctly extracted, using 200 BS/PL forms from which layout was not correctly extracted without auxiliary line addition and line interval adjustment 106.

OCR support system 100 can be applied to (support) separate OCR engines or incorporated with (or within) a particular OCR engine. OCR support system 100 can improve the digitalization of approval process at enterprises.

OCR support system 100 can be applied to archive/classification of documents, newspapers, magazines, and books. OCR support system 100 can provide efficiency improvement at for auditing and accounting purposes.

Figure 2:
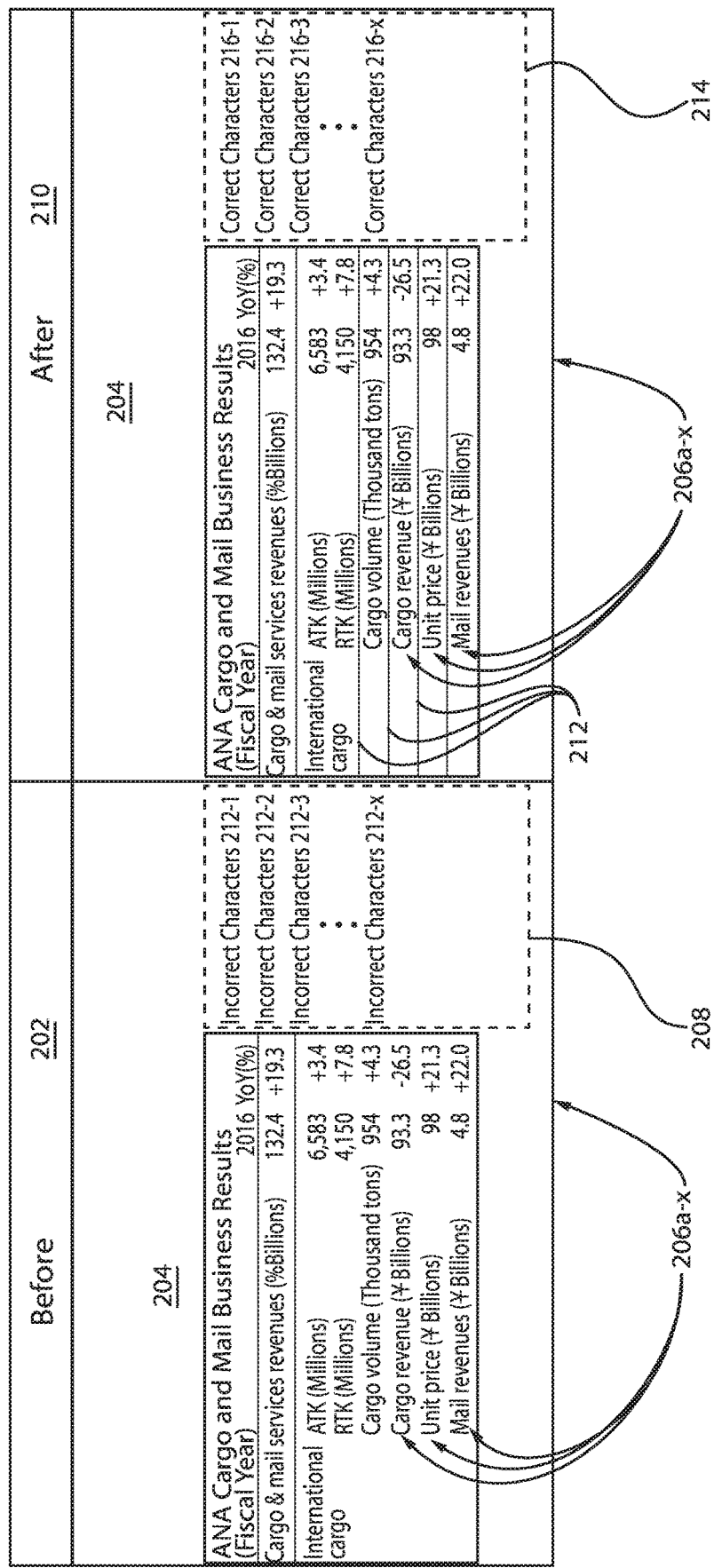
FIG. 2 is a block diagram illustrating pre-processing of a table based on addition of auxiliary lines, in accordance with an embodiment of the present invention.

Referring now to FIG. 2, there is shown a block diagram 200 illustrating pre-processing of a table based on addition of auxiliary lines, in accordance with an example embodiment.

As can be seen in FIG. 2, the table 204 initially (before, 202) includes characters 206-1 to 206-$x$ (for example, words and numbers, etc.) arranged in sections (without horizontal or vertical guidelines). In this example instance, the extracted words (via an OCR engine, not shown in FIG. 2) are incorrect (208). The incorrect characters 212-1 to 212-$x$ can include garbled OCR output from the OCR engine (for example, the section headed by International ATK (Millions) from the original table can be processed to provide an incorrect result in which numbers and other characters are substituted for the original text/numbers, such as "International ATU (Millions) 5BBT+3.4 cargo RTK (Millions) 5./SD mU.B Cargo volume (Thousand tons) BBS+4.B Cargo revenues (5 Billions) 9CC+BB.5 Unit price (5/kg) Dd+2/.B."

The addition of auxiliary lines 212 by OCR support system 100, as shown after 210, can allow the OCR engine to extract the correct words 214.

Pre-process 144 can include addition of vertical lines (vlines) for non-chart forms, addition of horizontal lines (hlines) after addition of vlines. In some instances, just hlines can be added without adding vlines (and vice versa). Pre-process 144 can also include division into blocks (with skipping of the addition of vlines or hlines in instances in which the vlines or hlines overwrite the blocks). Pre-process 144 can include addition of horizontal/vertical lines based on machine learning results. OCR support system 100 can add auxiliary lines to images, and improve the correct recognition ratio of the OCR engine.

Figure 3:
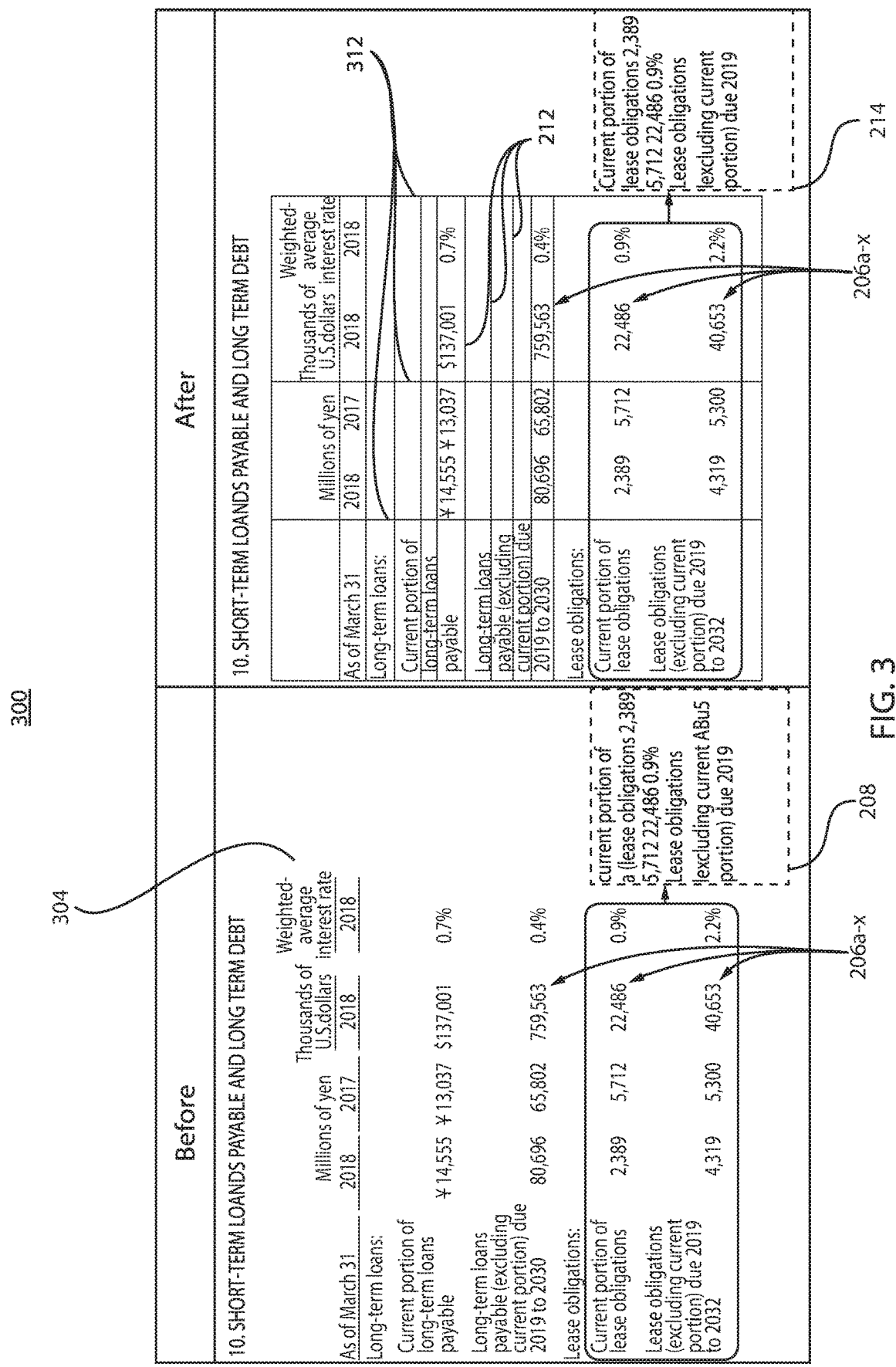
FIG. 3 is a block diagram illustrating pre-processing of a non-table based on addition of auxiliary lines, in accordance with an embodiment of the present invention.

Referring now to FIG. 3, a block diagram 300 illustrating pre-processing of a non-table based on addition of auxiliary lines is provided, in accordance with an example embodiment.

As shown in FIG. 3, a document (before 302) can include characters 2061-$x$ presented in a non-table format 304. The extracted words (for example, by OCR engine 112) are in this example incorrect 208. In some instances, layout extraction fails for non-table forms and forms in which letters are printed vertically. For example, the letters and sentences can be free-floating in the document with different sentences along different horizontal planes. In this instance, in which the form is not a table, pre-process 144 adds vertical lines 312 to convert the document to a table (after 303). Pre-process 144 can also, in some instances, distinguish between different fonts (and, for example, underlining, italicization, colors, etc.) and sizes of fonts (for example, based on a different font size used to add commentary to a document) to determine placement of guidelines (vertical lines and horizontal lines) for processing. In other instances, pre-process 144 can identify different backgrounds of the text (for example, different colors, stipple, etc.). The vertical lines 312 can be used to separate different columns in a document (for example, a document that includes multiple different columns on a same page). The vertical lines 312 can be used to isolate highlighted sections of a document. After (310) the vertical lines are added, the correct words are extracted (for example, by a same OCR engine 112, extracted words correct 214).

Figure 4:
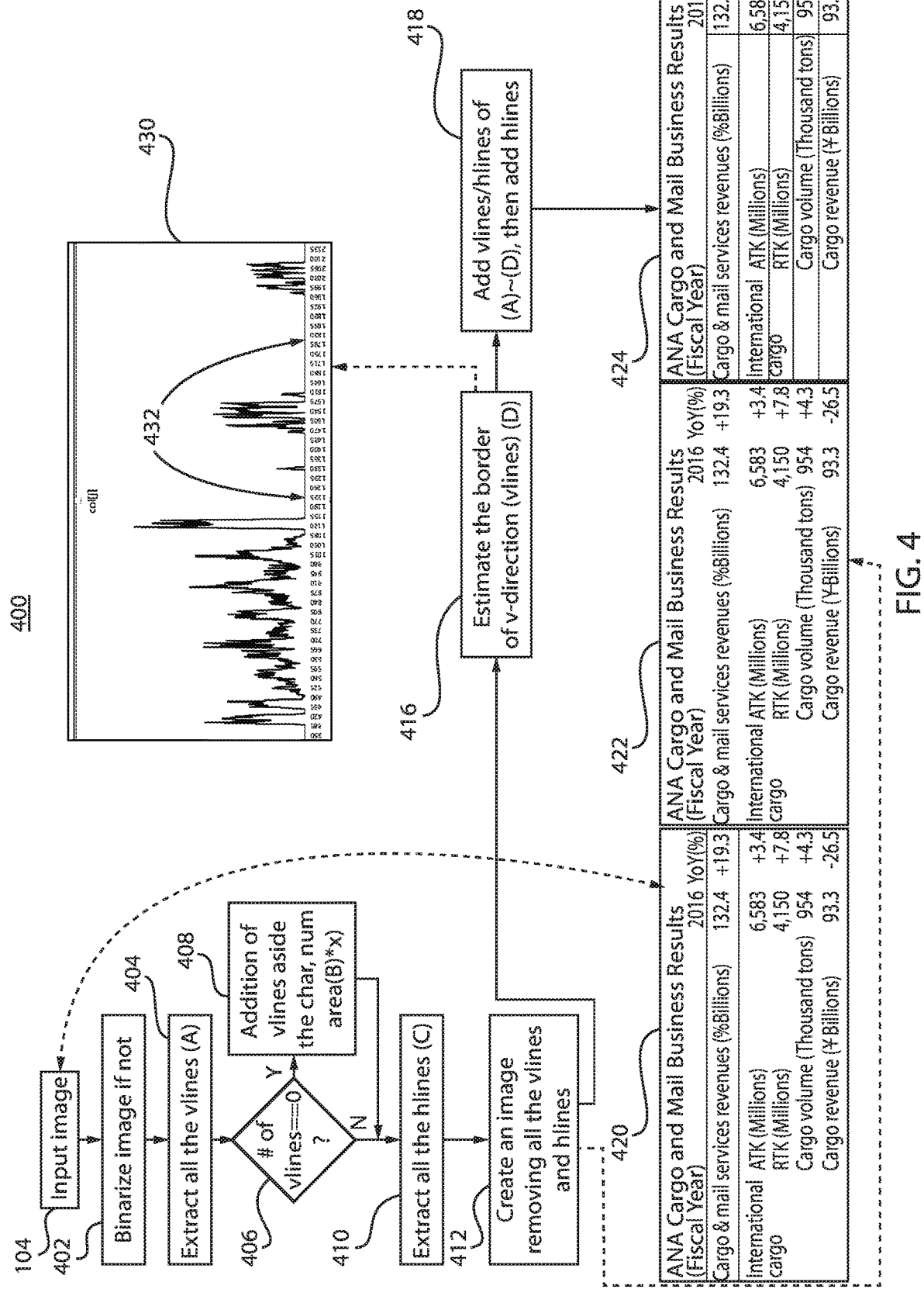
FIG. 4 is a flow diagram illustrating pre-processing of a form based on addition of horizontal auxiliary lines, in accordance with an embodiment of the present invention.

Referring now to FIG. 4, a flow diagram illustrating pre-processing of a form based on addition of horizontal auxiliary lines 400 is provided, in accordance with an example embodiment.

The designation x) in FIG. 4, other FIGS., and description below means that, in the process of adding or extending hlines/vlines, pre-process 144 skips drawing additional hlines/vlines if chars/nums already exist in the areas to be drawn, and/or pre-process 144 shifts the location of hlines/vlines incrementally (for example, a bit) if characters/numbers area can be avoided, as described in detail below with respect to FIG. 6.

As shown in FIG. 4, an input image 104 is received (for example, image 420 by OCR support system 100). Pre-processing 400 includes determining whether the input image 104 has been binarized and, if the image has not been previously binarized, binarization of the input image (binarize image if not 402). For example, pre-process 144 can apply a binarization process, such as $Y=0.299R+0.587G+0.114B$. Y represents grayscale, R represents red, G represents green and B represents blue. Pre-process 144 then extracts all the vertical lines (vlines) (A) (block 404).

Pre-process 144 determines whether the number of vertical lines is equal to zero (# of vlines=0) (decision/determination 406). If the number of vlines is equal to zero (406, yes (Y)), pre-process 144 adds vlines to the sides of the area (Addition of vlines aside the char,num area (B)*x)) (block 408). According to an example, at block 408, pre-process 144 adds 2 vlines (right and left of the letter/number area) if no vlines exist in the image so that OCR can identify that letters/numbers exist between newly added vlines. Then pre-process 144 extracts all the horizontal lines (hlines) (C) (block 410). In this instance, extraction includes identifying the horizontal lines. Hline extraction is performed regardless of result of 406. After extracting all the horizontal lines (hlines), pre-process 144 creates an image (see, for example, image 422) removing all the vlines and hlines (block 412). At block 412, pre-process 144 outputs image without hlines or vlines regardless of the result of 406. Therefore, 406 can determine number of vlines.

Pre-process 144 estimates the border of v-direction (vlines) (based on the total of pixels of rows in each column (col[j]) (D)) (block 416). As shown in column pixel count graph which shows the total of pixels of rows in each column (col[j]) 430, the spaces in the vertical direction (432) can be identified, for example, based on a determination of the number of pixels along a vertical plane. Pre-process 144 adds vlines/hlines of (A)~(D) (respectively, blocks 404, 408, 410, and 416), and then adds hlines (block 418), for example, based on processes described with respect to FIG. 5, particularly blocks 510, 518, 538, 540 and 546.

Figure 5:
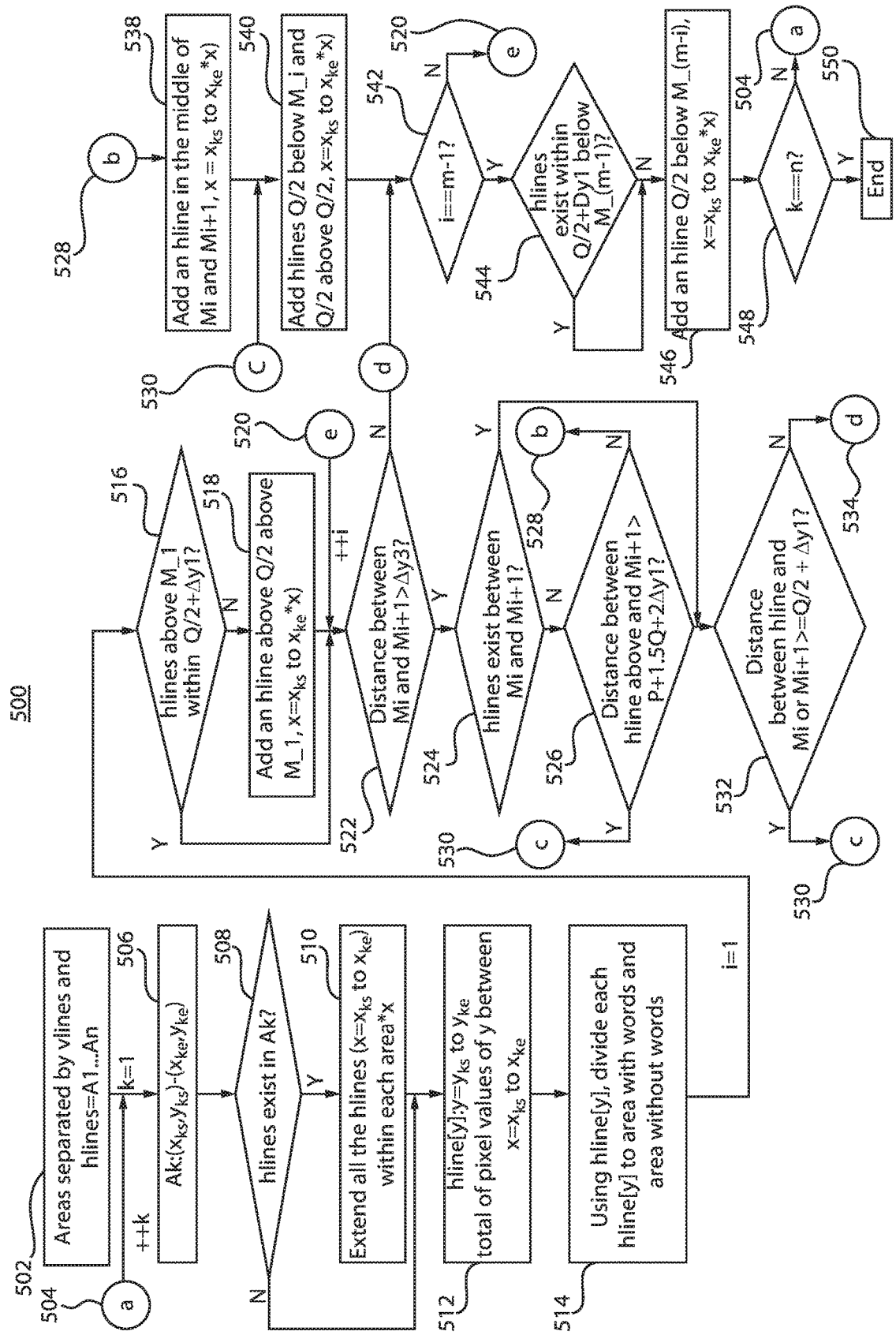
FIG. 5 is a flow diagram illustrating pre-processing to add horizontal auxiliary lines after addition of vertical auxiliary lines, in accordance with an embodiment of the present invention.

Referring now to FIG. 5 is a flow diagram 500 illustrating pre-processing to add horizontal auxiliary lines after addition of vertical auxiliary lines, in accordance with an example embodiment.

Pre-process 144 identifies areas separated by vlines and hlines (for areas)=A1 . . . An (block 502). Starting with k=1 (for example, a first area) and incrementing sequentially thereafter (++k), pre-process 144 applies Ak:$(x_{ks}, y_{ks})-(x_{ke}, y_{ke})$. Ak refers to the "k-th Area". (x,y) represents the coordinate. For example, (0,0) is the upper left pixel of the image and (width-1,height-1) is the lower right of the image, where "width" and "height" are width and height of the image, respectively. $(x_{ks}, y_{ks})-(x_{ke}, y_{ke})$ means that the area Ak is the rectangle whose coordinates of upper-left and lower-right vertexes are $(x_{ks}, y_{ks})$ and $(x_{ke}, y_{ke})$, respectively. Pre-process 144 then determines whether hlines exist in Ak (decision/determination 508). If hlines exist in Ak (508, Y), pre-process 144 then extends all the hlines (x=$x_{ks}$ to $x_{ke}$) within each area (block 510)*x). After 510 or if there are no hlines in Ak (508, N), pre-process 144 then determines (for, hline[y]: y=$y_{ks}$ to $y_{ke}$) a total of pixel values of y between x=$x_{ks}$ to $x_{ke}$ (block 512).

At block 514, pre-process 144 then uses hline[y] to divide each hline[y] into areas with words and areas without word, and also gets (for example, determines) a median of continuous word area (P) and continuous non-word area (Q) for y-direction, and gets the areas where y', size of continuous word are for y-direction, satisfies P-$\Delta y0$<=y'<=P+$\Delta y0$, as M_1, . . . , M_m. $\Delta y0$~$\Delta y4$: are constant numbers. $\Delta y0$ to $\Delta y4$ are fixed pre-defined numbers.

In FIG. 16, M_i represents the area of each word (for example, for a document with 13 rows, i=1 to (variable) 13 in this example). P is the median (length) of continuous word area for y-direction (vertical direction). For example, median of length of M1, . . . , M_13, where M represents a row in the document. Q is the median (length) of noncontinuous word area for y-direction (vertical direction). For example, median of length between M_1 and M_2, M_2 and M_3, . . . , M_12 and M_13, in this example.

Pre-process 144 determines (starting at area i=1, after block 514) whether hlines above M1 (are) within Q/2+$\Delta y1$ (decision 516) is no (N), then, at block 518, pre-process 144 adds a hline above Q/2 and above M1, x=$x_{ks}$ to $x_{ke}$*x). After 518 or if the decision 516 is yes (Y), pre-process 144 determines (decision 522) whether a distance between M_i and M_(i+1)>$\Delta y3$.

If the distance between M_i and M_(i+1)>$\Delta y3$ (decision 522 is Y), pre-process 144 determines (decision 524) whether hlines exist between M_i and M_(i+1). If there are no hlines between M_i and M_(i+1) (decision 524 is N), pre-process 144 determines (decision 526) whether a distance between hline above and M_(i+1)>P+1.5Q+2$\Delta y1$. If the distance between hline above and M_(i+1)>P+1.5Q+2$\Delta y1$ (decision 526 is Y) then pre-process 144 goes to block 540. If distance between hline above and M_(i+1) is not greater than P+1.5Q+2$\Delta y1$ (decision 526 is N) then pre-process 144 goes to block 538.

If there are hlines between M_i and M_(i+1) (decision 524 is Y), pre-process 144 determines (decision 532) whether a distance between hline and M_i or M_(i+1)>=Q/2+$\Delta y1$. If distance between hline and M_i or M_(i+1)>=Q/2+$\Delta y1$ (decision/determination 532 is Y), then pre-process 144 goes to block 540. If distance between hline and M_i or M_(i+1)<Q/2+$\Delta y1$, then pre-process 144 goes to decision 542.

In block 538, pre-process 144 proceeds by adding an hline in the middle of M_i and M_(i+1), x=$x_{ks}$ to $x_{ke}$*x). Pre-process 144 then adds hlines Q/2 below M_i and Q/2 above Q/2, x=$x_{ks}$ to $x_{ke}$*x) (block 540).

After block 540 or decision 522 is N, pre-process determines whether i==m-1 (decision/determination 542). If i is not equal to m-1 (decision/determination 542 is N), then pre-process 144 proceeds (back) to decision 522. If i=m-1 (decision/determination 542 is Y), then pre-process 144 determines (decision 544) whether hlines exist within Q/2+$\Delta y1$ below M_(m-1).

If no hlines exist within Q/2+$\Delta y1$ below M_(m-1) (decision/determination 544 is N), pre-process 144 (at block 546) adds an hline Q/2 below M_(m-1), x=$x_{ks}$ to $x_{ke}$*x). After 546 or if hlines exist within Q/2+$\Delta y1$ below M_(m-1) (decision/determination 544 is Y), pre-process 144 then determines (decision 548) whether k==n. If k< >n, then pre-process 144 returns to 506 after adding 1 to k (++k). If k==n, then pre-process 144 ends the process (block 550).

Figure 6:
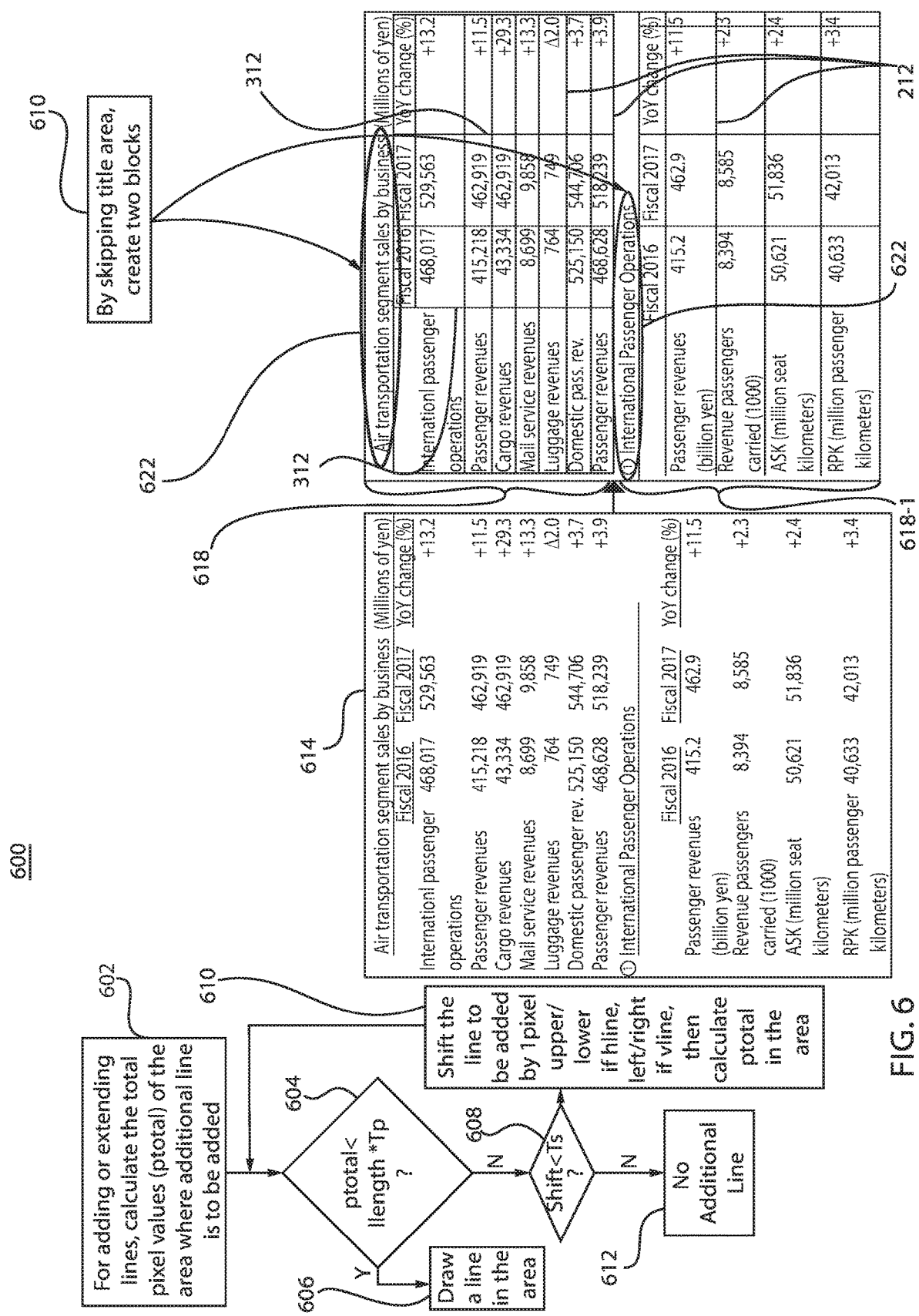
FIG. 6 is a flow diagram illustrating division of a form into blocks, in accordance with an embodiment of the present invention.

Referring now to FIG. 6, a flow diagram 600 illustrating division of a form into blocks is provided, in accordance with an example embodiment.

In the process of adding or extending hlines/vlines (for example, blocks 510, 518, 538, 540 and 546 described herein above), pre-process 144 skips drawing additional hlines/vlines if chars/nums already exist in the areas to be drawn.*x as shown is applicable to both hlines and vlines. Pre-process 144 also shifts the location of hlines/vlines incrementally (for example, a bit) if characters/numbers area can be avoided.

For adding or extending hlines, pre-process 144 calculates the total pixel values (ptotal) of the area where additional line is to be added (block 602). Pre-process 144 then determines (decision 604) whether ptotal<llengh*Tp. In this instance llength corresponds to length of lines to be drawn, and Tp is a pre-defined threshold, for example, 0.01.

If ptotal<llengh*Tp (decision 604=Y), pre-process 144 draws a line in the area (block 606). If ptotal<llengh*Tp, pre-process 144 determines (decision 608) whether shift<Ts. In this instance, Ts is a pre-defined max shift, for example, 3. If shift<Ts (decision 608=Y), pre-process 144 goes to block 610 and shifts the line to be added by 1 pixel upper/lower if hline, left/right if vline, then calculates ptotal in the area. For example, if vline, pre-process 144 shifts 1 pixel to left→1 pixel to right, 2-pixels to left, . . . and stops at 3 pixel to right if Ts=4, and goes back to decision 604.

If shift is not less than Ts (decision 608=N), pre-process 144 does not create an additional line (no additional line, block 612).

As shown in regards to form 614, which illustrates a form without lines, and form 622, which illustrates form 614 after adding lines (horizontal lines 212 and vertical lines 312) to create columns and rows of a table 618, by skipping title area (622), (pre-process 144) create(s) two blocks (block 610).

Figure 7:
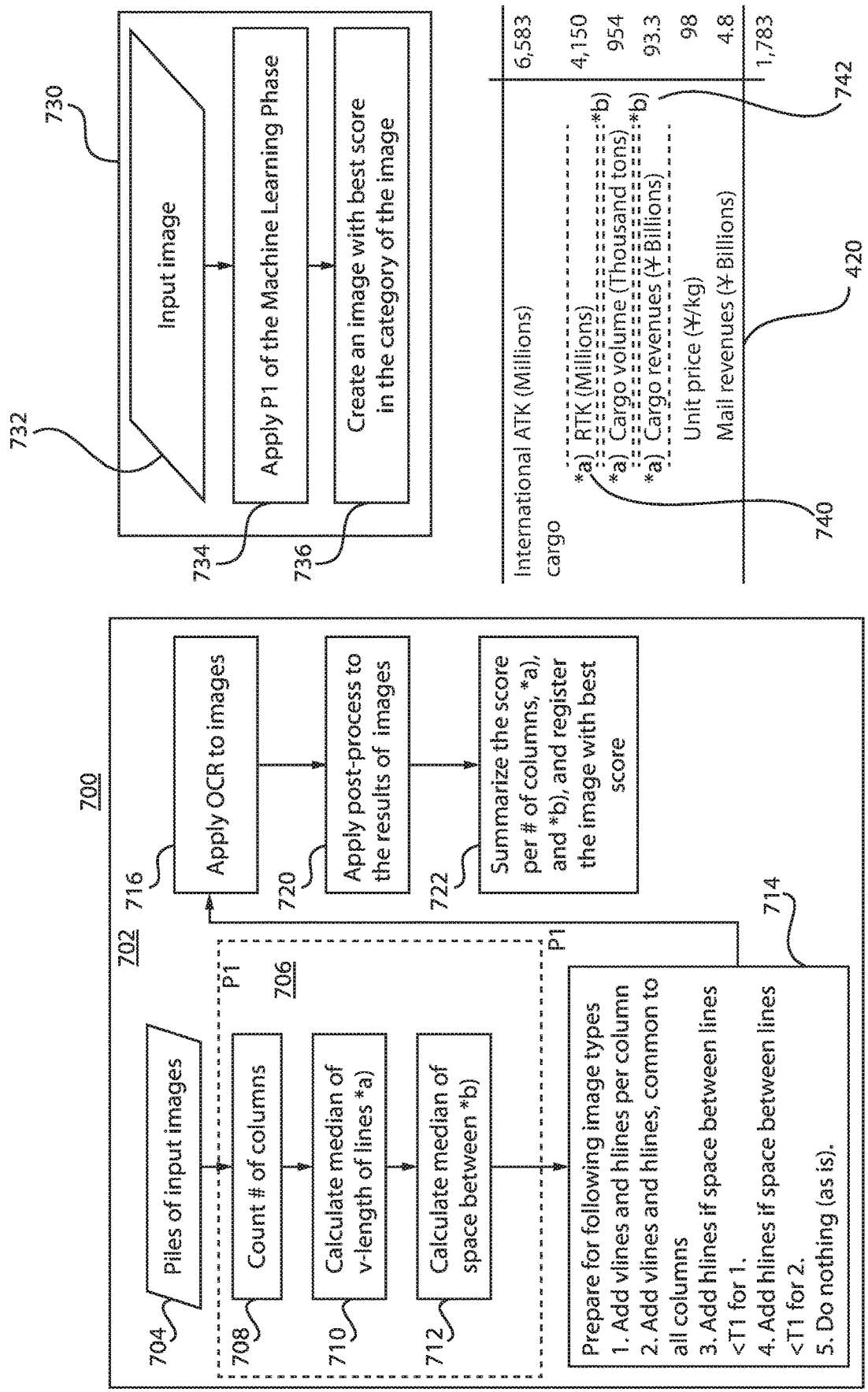
FIG. 7 is a flow diagram showing addition of horizontal/vertical lines based on machine learning results, in accordance with an embodiment of the present invention.

Referring now to FIG. 7, a flow diagram 700 showing addition of horizontal/vertical lines based on machine learning results is provided, in accordance with an example embodiment.

Pre-process 144 can add horizontal/vertical lines based on machine learning (702) results. According to an example embodiment, machine learning 702 can be implemented by post-process 118 during learning phase 102. Pre-process 144, while implementing machine learning 702, receives sets of input images 704. Pre-process 144 then processes (P1 706) the piles of input images 704. The processing (P1 706) includes counting a number of columns (count # of columns (Block 708)), calculate(s) median of v-length of lines (*a)

740 shown added to table 420) (block 710), and calculate(s) median of space between (*b) 742 shown added to table 420) (block 712).

Pre-process 144 then prepare(s) (block 714) a set of images for testing. For example, the set of images can include the following (types of) images (that can include, for example, the following modifications). 1) Add(ed) vlines and hlines per column; 2) Add(ed) vlines and hlines, common to all columns; 3) Add(ed) hlines if space between lines <T1 for 1; 4) Add hlines if space between lines <T1 for 2; and 5) Do nothing ((let image remain) as is).

Pre-process 144 then applies OCR to each of the images (block 716). Pre-process 144 applies post-process to the results of the images (block 720). Pre-process 144 then summarize(s) the score per # of columns, *a), and *b), and register(s) the image (of the prepared set of images, for example with modifications 1.~5., described in the preceding paragraph) with the best score in the category.

With reference to pre-process determination 730, pre-process 144 can determine pre-process procedure based on the results of pre-processing, OCR, and post-processing. During pre-process determination 730, pre-process 144 receives an input image 732. Pre-process 144 then applies processes P1 (706) of the machine learning phase (702).

Pre-process 144 create(s) an image with the best score in the category of the image.

Referring back to FIG. 1, according to an example embodiment, post-process 118 removes noise by morphological analysis. Post-process 118 measures a similarity between two words by converting to images and superimposing the images. Post-process 118 takes the depth of images into consideration while superimposing the images. Post-process 118 also applies weighting of post-process items based on machine-learning.

Post-process 118 first removes noise then selects one word that is expected to be the correct word that was included in the document before being garbled through OCR, from correct word candidates dictionary 132 (for example, correct word candidates dictionary 132 can include approximately (candidate) 30,000 words), by scoring of combinations of OCR accuracy evaluators, such as described with respect to OCR accuracy evaluators 1 through 4 herein below.

Post-process 118, when performing noise reduction, can implement a frequent edit operation, such as described with respect to FIG. 8, herein below. Post-process 118 can inversely convert a garbled word based on frequent edit operation (e.g. " $\mathcal{I}$ " is converted to " $\mathcal{I}$ " or "In" is converted to "1n"). Post-process 118 can also perform noise reduction based on morphological matching. After morphologically analyzing garbled word and all of the candidate of the correct words, post-process 118 excludes all of the morphemes not included in any morpheme of candidate words from the garbled word.

Post-process 118 can apply the following OCR accuracy evaluators to determine whether the OCR process has determined a correct word. Post-process 118 can determine edit distance (e.g. Levenshtein distance). Particularly, post-process 118 can determine how much edit operation is required to make the garbled word to each of candidate correct word. Post-process 118 can determine an image distance for each of the candidate correct word. For example, post-process 118 can determine a cosine distance between the garbled word and each of candidate word, regarding each word as binary image. Post-process 118 can determine a number of same letters for the candidate correct words. For example, post-process 118 can count the number of same letters between the garbled word and each of candidate correct word. Post-process 118 can count the frequency of use in the past. For example, post-process 118 can determine how many times the candidate word has been used in the correction in the past.

For each garbled word, post-process 118 first performs noise reduction, and for all of the results (can be more than one) and the original garbled word, applies the OCR accuracy evaluators. For all of the candidate correct words, post-process 118 calculates score for each candidate by weighting the result of each of the OCR accuracy evaluators using the weight calculated at the learning phase 102, and outputs one candidate word that gives highest score.

Figure 8:
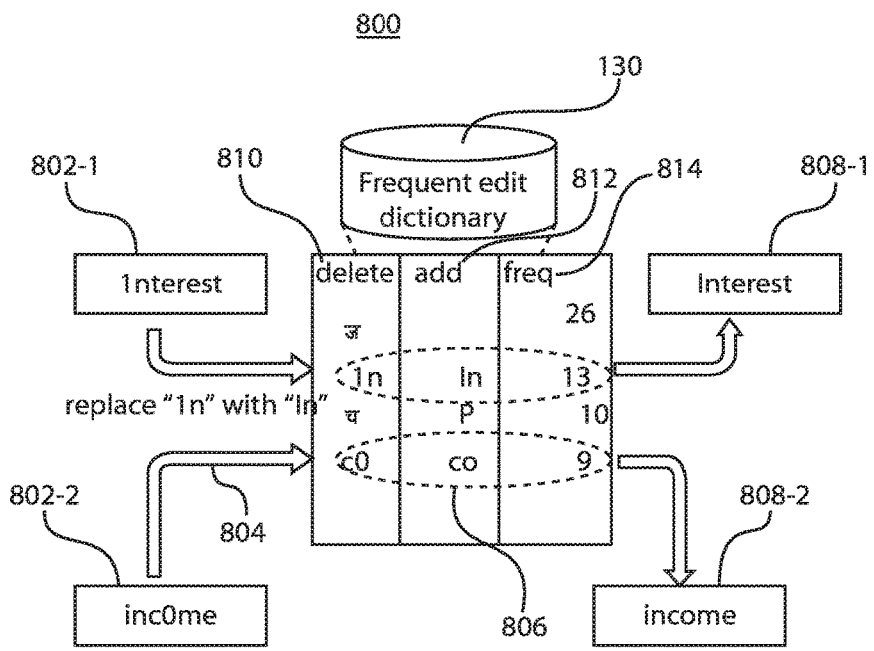
FIG. 8 is a flow diagram showing post-processing based on a frequent edit operation, in accordance with an embodiment of the present invention.

Referring now to FIG. 8, a flow diagram 800 showing post-processing based on a frequent edit operation is provided, in accordance with an example embodiment.

Post-process 118 can perform noise reduction via a frequent edit operation at garbled word correction. This process can be implemented in advance of scoring the candidate correct words. Post-process 118 registers the edit operation of how garbled words are corrected with the frequency to frequent edit dictionary 130, before learning phase 102. For example, replace " $\mathcal{I}$ " with " $\mathcal{I}$ ", 13 times.

At correction time, for the garbled word 802 (for example, 802-1 (1nterest) and 802-2 (inc0me) in FIG. 8), post-process 118 swaps the segment (for example, an item 1n and c0) included in the garbled words 802 from "delete" column 810 of the registered edit operation with the item in "add" column 812 if frequency (814)>=Threshold (for example, 3), and saves (for example, memorizes) the swapped word 808 as the correct word.

Figure 9:
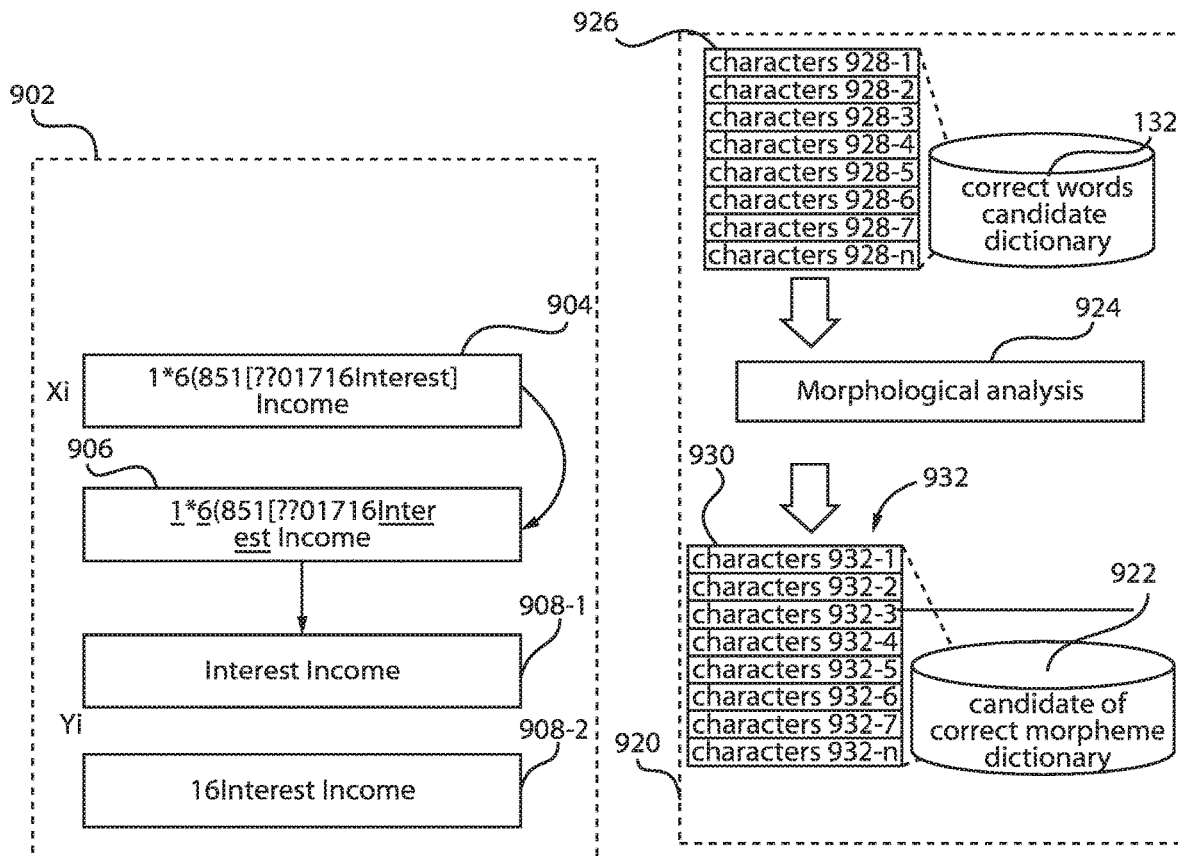
FIG. 9 is a flow diagram showing noise reduction that excludes all of the morphemes not included in any morpheme of candidate words, in accordance with an embodiment of the present invention.

FIG. 9 is a flow diagram 900 showing noise reduction that excludes all of the morphemes not included in any morpheme of candidate words, in accordance with an embodiment of the present invention.

A morpheme is the smallest grammatical unit in a language. Post-process 118 excludes all of the morphemes not included in any morpheme of candidate words (for example, in advance of learning phase 102). Post-process 118 morphologically analyzes (924) all of the candidate of correct words (depicted in table 926 as candidate of correct words 928-1 to 928-n) from the correct words candidate dictionary 132, and creates (or adds to) a candidate of correct morpheme dictionary 922 (including a morpheme table 930 with morphemes 932-1 to 932-n).

As shown in FIG. 9, garbled word correction 902 can include receiving a garbled word 904 (Xi) and morphologically analyzing the word to determine morphemes (shown as underlined) within the garbled word 906. Post-process 118 then recombines the word based on the underlined morphemes (908-1 and 908-2). If the word exists in the candidate of correct word dictionary, post-process 118 adopts the word as correct word candidate.

At the time of word correction, post-process 118 morphologically analyzes the garbled word. Post-process 118 removes morphemes not included in the candidate of correct morpheme dictionary 922. Post-process 118 thereby removes noise (letters) which have less than a (e.g., predetermined) minimum (for example, small) probability of being included in the correct word. For each garbled word produced in noise reduction by frequency edit operation (FIG. 8 herein above), post-process 118 determines candidates for a correct word by applying further noise reduction by excluding morphemes (Yi=φ if no new word produced from Xi by above), then performs the OCR accuracy evaluation processes, such as further described herein below. If characters (for example, numbers) remain as morpheme, post-process 118 can iteratively attempt to use and not use these numbers with the edit (for example, Levenshtein) distance.

Post-process 118 can implement an OCR accuracy evaluator based on edit (for example, Levenshtein) distance. Post-process 118 determines how much edit operation is needed to make the two words to be same. For example, an edit distance between "c0m1ng" and "comings" is 3, as there are three changes that need to be made to change one word into the other. According to an example, d=Distance/(max (L1,L2)) as distance where Li is length of letter i.

Figure 10:
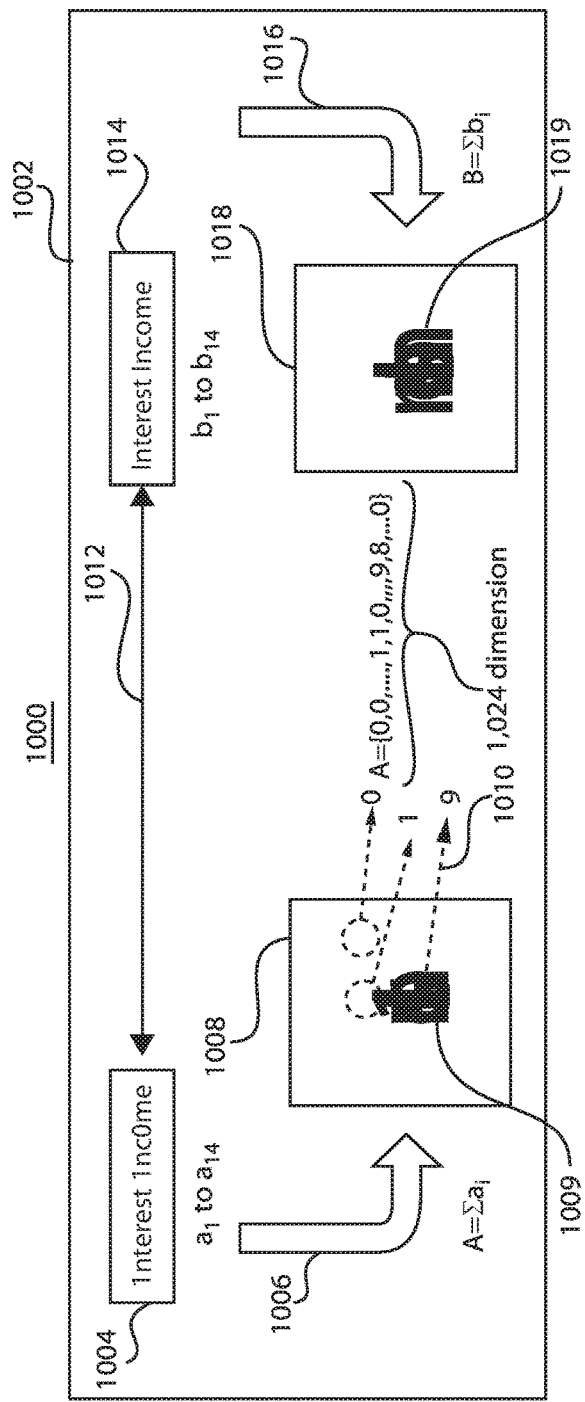
FIG. 10 is a diagram illustrating post-processing based on image distance, in accordance with an embodiment of the present invention.

FIG. 10 is a block diagram 1000 illustrating post-processing based on image distance, in accordance with an example embodiment.

As shown in FIG. 10, post-process 118 calculates a cosine distance between two words (that are represented) as images (for example, binary data). For example words 1nterest 1nc0me (1004) (with characters $a_1$ to $a_{14}$) and Interest Income (1014) (with characters $b_1$ to $b_{14}$). Fonts and sizes are selectable. Post-process 118 defines a font type and size, e.g., "MS mincho font size=32." Post-process 118 then superimposes 1006 (for example, A=$\Sigma a_i$ and B=$\Sigma b_i$) letter images in each word (creating a superimposed image 1008, 1018), and creates a vector 1010 counting the number of superimpose letters (or parts of letters) at each pixel 1009, 1019 (for example A={0,0, . . . , 1,1,0, . . . , 9,8, . . . 0}). The images 1009 and 1019, shown in FIG. 10 represents multiple letters (or characters) in a same word that have been superimposed (for example, printed, layered, etc.) on a same area. Image 1009 represents the characters of the phrase 1nterest 1nc0me superimposed on each other and image 1019 represents the characters of the word Interest Income superimposed on each other. Each letter can be resized, rotated, or shifted.

Post-process 118 then determines image distance (1012)=A·B/|A||B|. A, B are 32×32 dimension vectors in which binary of ai and bi are added. Post-process 118 can thereby calculate image distance regardless of number of letters in each word. By calculating the vectors of the correct word candidates in advance and register them (vectors and their sizes), post-process 118 can implement (relatively) fast image distance calculation, for example, 10 times faster than the case of calculating vectors and their sizes of candidates at image distance calculation.

Post-process 118 can apply an OCR accuracy evaluator based on a number of same letters. Post-process 118 can count number of same letters between the garbled word and all of the candidate of correct words. Post-process 118 can also count the frequency of use in the past. For example, from the candidate of correct words, post-process 118 can count how many times the word was used.

Figure 11:
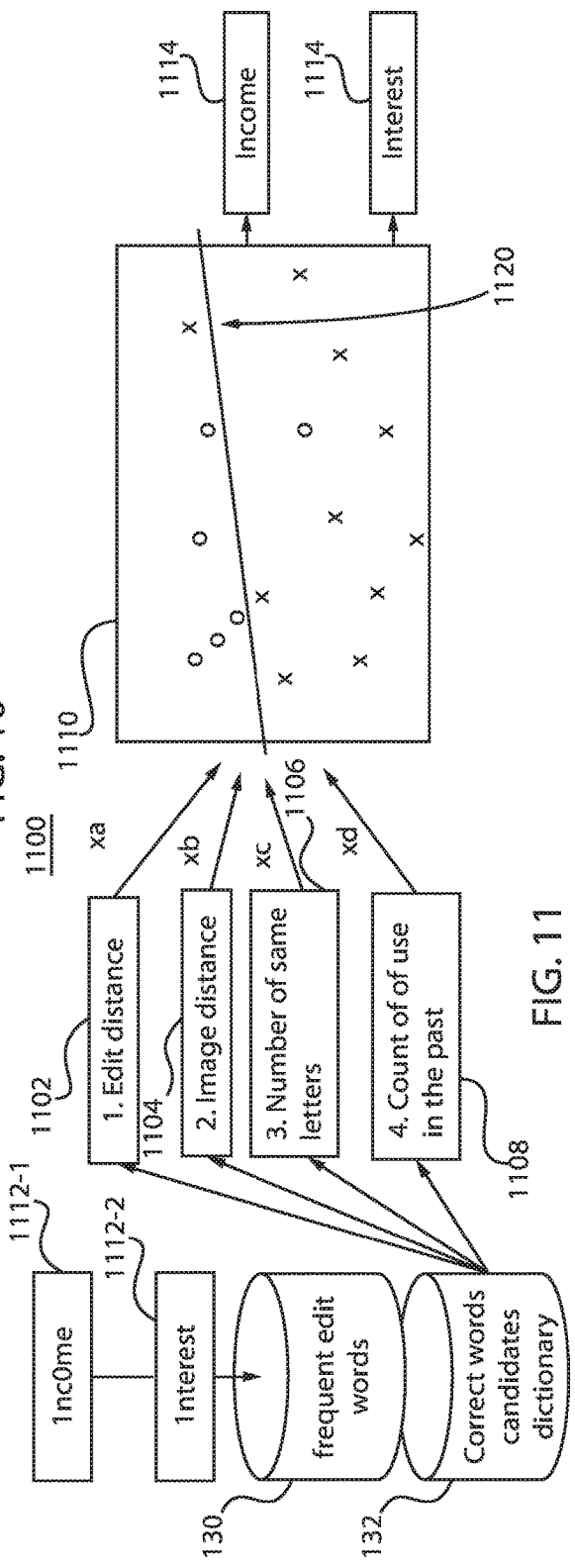
FIG. 11 is a flow diagram showing post-processing based on correction of a garbled word by weighting result of each process, in accordance with an embodiment of the present invention.

FIG. 11 is a flow diagram 1100 showing post-processing based on correction of a garbled word by weighting result of each process, in accordance with example embodiments.

As shown in FIG. 11, the system (for example, post-process 118) receives garbled words 1112 (for example, 1nc0me (1112-1), and 1nterest 1112-2).

Post-process 118 defines weight (in this example, a, b, c, d) of accuracy evaluators (in this example, 1. edit distance (1102), 2. image distance (1104), 3. number of same letters (1106), 4. count of words used in the past (1108), etc.) using past sets (for example, piles, groups, etc.) of (garbled, correct) word pairs (for example, determined during learning phase 102 and stored in correct words candidates dictionary 132). For each garbled word, post-process 118 selects one correct word which yields a best score 1120 (word correction) based on a multi-dimensional plot 1110 of the accuracy evaluators (for example, a four dimensional plot for four accuracy evaluators) in which x represents an incorrect word and o represents a correct word.

According to an example, post-process 118 determines and assigns a score to each pair based on a linear sum, such as:

score=Edit distance*a+Image distance*b+Number of same letters*c+Count of words used in the past*d.

For each garbled word, post-process 118 calculates a score for each candidate word, using weight a, b, c, d, and selects a candidate which yields maximum score.

According to an additional example, each process result z (for example, edit distance, image distance, number of same letters, or count of words) can be as determined as $z^n$, log(z). For example, score may be written as: score=log(Edit distance)*a+log(Image distance)*b+log(Number of same letters)*c+log(Count of words used in the past)*d.

Figure 12:
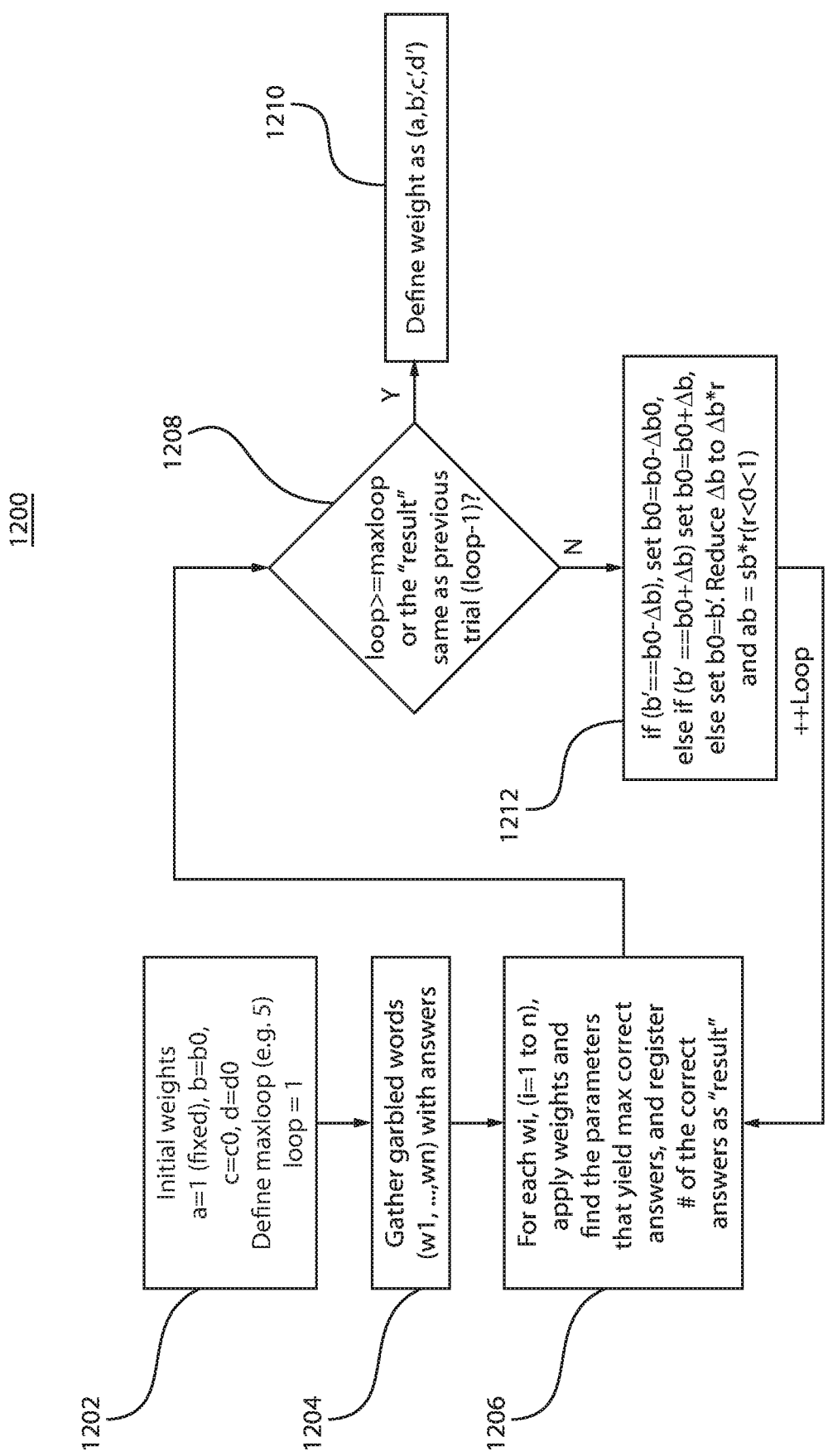
FIG. 12 is a flow diagram showing machine learning to determine weights, in accordance with an embodiment of the present invention.

FIG. 12 is a flow diagram showing machine learning to determine weight, in accordance with an example embodiment.

As shown in FIG. 12, post-process 118 (during learning phase 102) can apply machine learning to determine the weights.

At block 1202, post-process 118 can determine initial weights:

a=1 (fixed), b=b0, c=c0, d=d0, where b0, c0, and d0 are pre-defined numbers.

and define maxloop (e.g. 5), loop=1.

At block 1204, post-process 118 gathers garbled words (w1, . . . , wn) with answers.

At block 1206, for each wi, (i=1 to n), post-process 118 applies weights (b0−$\Delta$b to b0+$\Delta$b by step sb, c0−$\Delta$c to c0+$\Delta$c by step sc, d0−$\Delta$d to d0+$\Delta$d by step sd, and finds the parameters (a,b',c',d') that yield max correct answers, and registers a number (#) of the correct answers as "result", where $\Delta$b, $\Delta$c, $\Delta$d,sb, and sc are predefined numbers.

At decision 1208, post-process 118 determines whether loop>=maxloop or the "result" same as previous trial (loop−1).

At block 1204, in response to determining that loop is less than maxloop or the "result" same as previous trial (loop−1) (decision 1208, N), post-process 118 applies the following limitations:

if (b'==b0−$\Delta$b), set b0=b0−$\Delta$b0, else if (b'==b0+$\Delta$b) set b0=b0+$\Delta$b, else set b0=b'. Reduce $\Delta$b to $\Delta$b*r and sb=sb*r (r<0<1).

Post-process 118 performs a similar process for c and d. Post-process 118 then increments the count (++loop) and returns to stage 1206.

At block 1210, in response to determining that loop>=maxloop or the "result" same as previous trial (loop−1) (decision 1208, Y), post-process 118 defines weight as (a, b', c', d').

Figure 13:
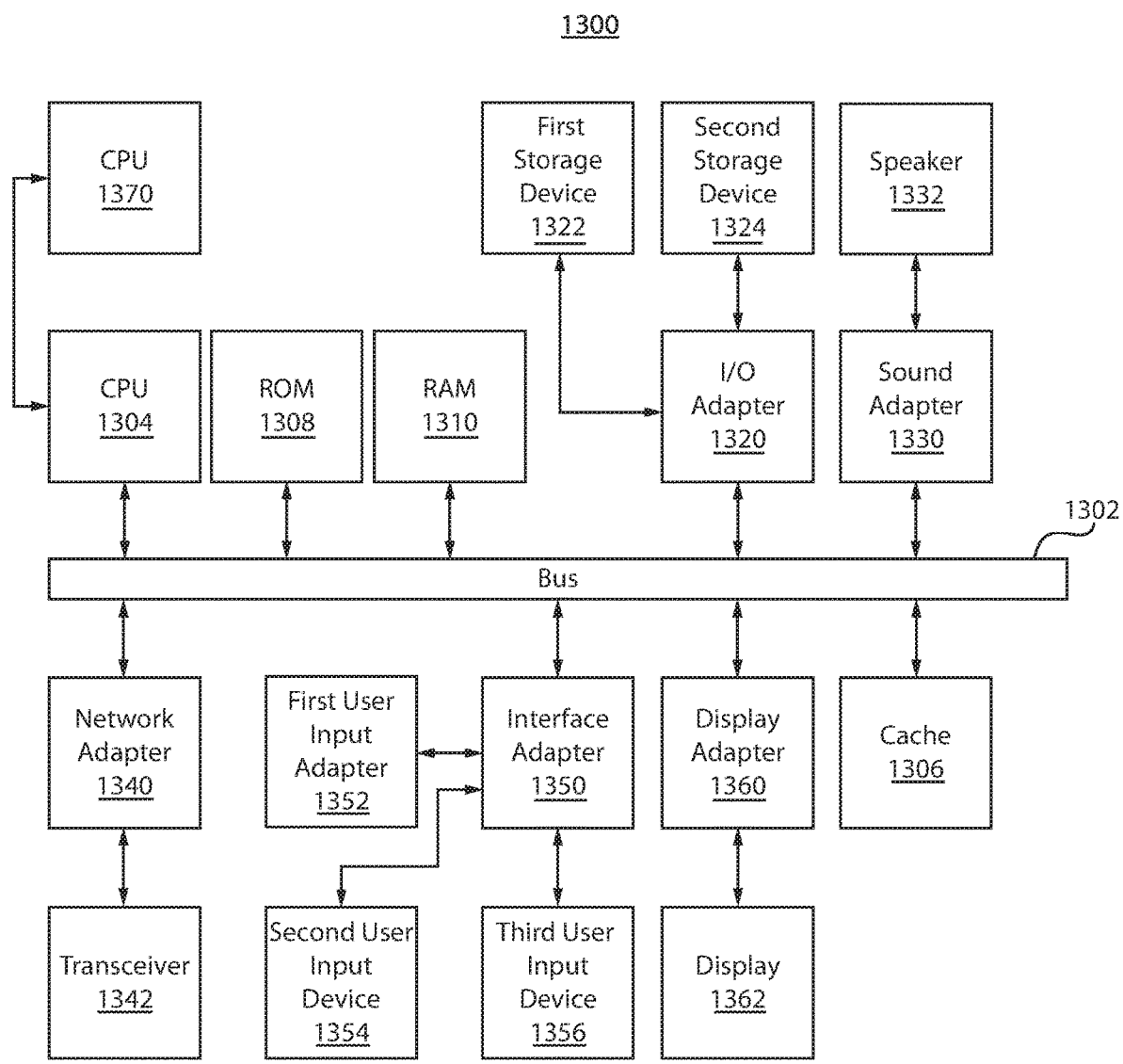
FIG. 13 is a block diagram of a processing system, in accordance with an embodiment of the present invention.

With reference to FIG. 13, an exemplary processing system 1300 to which the present invention may be applied is shown in accordance with one embodiment. The processing system 1300 includes at least one processor (CPU) 1304 operatively coupled to other components via a system bus 1302. A cache 1306, a Read Only Memory (ROM) 1308, a Random Access Memory (RAM) 1310, an input/output (I/O) adapter 1320, a sound adapter 1330, a network adapter 1340, a user interface adapter 1350, and a display adapter 1360, are operatively coupled to the system bus 1302.

A first storage device 1322 and a second storage device 1324 are operatively coupled to system bus 1302 by the I/O adapter 1320. The storage devices 1322 and 1324 can be any of a disk storage device (e.g., a magnetic or optical disk storage device), a solid state magnetic device, and so forth. The storage devices 1322 and 1324 can be the same type of storage device or different types of storage devices.

A speaker 1332 is operatively coupled to system bus 1302 by the sound adapter 1330. A transceiver 1342 is operatively coupled to system bus 1302 by network adapter 440. A display device 1362 is operatively coupled to system bus 1302 by display adapter 1360.

A first user input device 1352, a second user input device 1354, and a third user input device 1356 are operatively coupled to system bus 1302 by user interface adapter 1350. The user input devices 1352, 1354, and 1356 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 1352, 1354, and 1356 can be the same type of user input device or different types of user input devices. The user input devices 1352, 1354, and 1356 are used to input and output information to and from system 1300.

Data replication (DR) component 1370 may be operatively coupled to system bus 1302. DR component 1370 is configured to sample formulations within a formulation generation system as described above. DR component 1370 can be implemented as a standalone special purpose hardware device, or may be implemented as software stored on a storage device. In the embodiment in which DR component 1370 is software-implemented, although shown as a separate component of the computer system 1300, DR component 1370 can be stored on, e.g., the first storage device 1322 and/or the second storage device 1324. Alternatively, DR component 1370 can be stored on a separate storage device (not shown).

Of course, the processing system 1300 may also include other elements (not shown), as readily contemplated by one of skill in the art, as well as omit certain elements. For example, various other input devices and/or output devices can be included in processing system 1300, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 1300 are readily contemplated by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
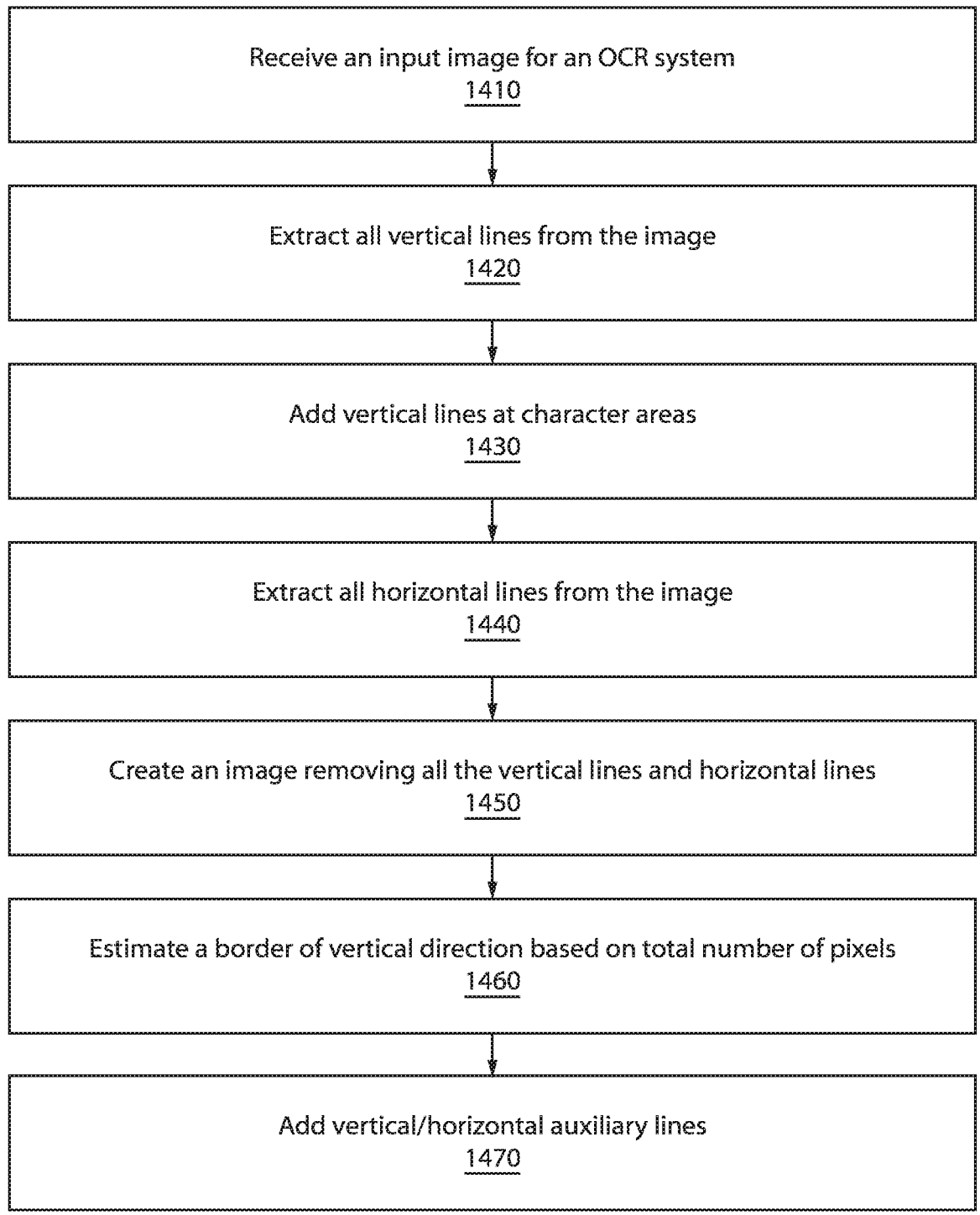
FIG. 14 is a flow diagram showing a method providing support for OCR, in accordance with an embodiment of the present invention.

FIG. 14 is a flow diagram 1400 showing a method to increase recognition rate of OCR system, in accordance with an embodiment of the present invention.

At block 1410, OCR support system 100 receives an input image for an OCR system.

At block 1420, OCR support system 100 extracts all vertical lines from the image.

At block 1430, OCR support system 100 adds vertical lines at character (and/or number) areas.

At block 1440, OCR support system 100 extracts all horizontal lines from the image.

At block 1450, OCR support system 100 creates an image removing all the vertical lines and horizontal lines.

At block 1460, OCR support system 100 estimates a border of v-direction (vlines) based on the total of pixels of rows in each column. For example, for each row in a particular column OCR support system 100 determines a total of pixels for that row. OCR support system 100 then sums the pixels for all the rows in that column.

At block 1470, OCR support system 100 then adds auxiliary lines that can include the lines extracted at blocks 1420 and 1430, the borders of the v-direction (determined at block 416) and additional horizontal lines in the blank space between words or numbers of a sheet image for increasing recognition rate of OCR system.

Figure 15:
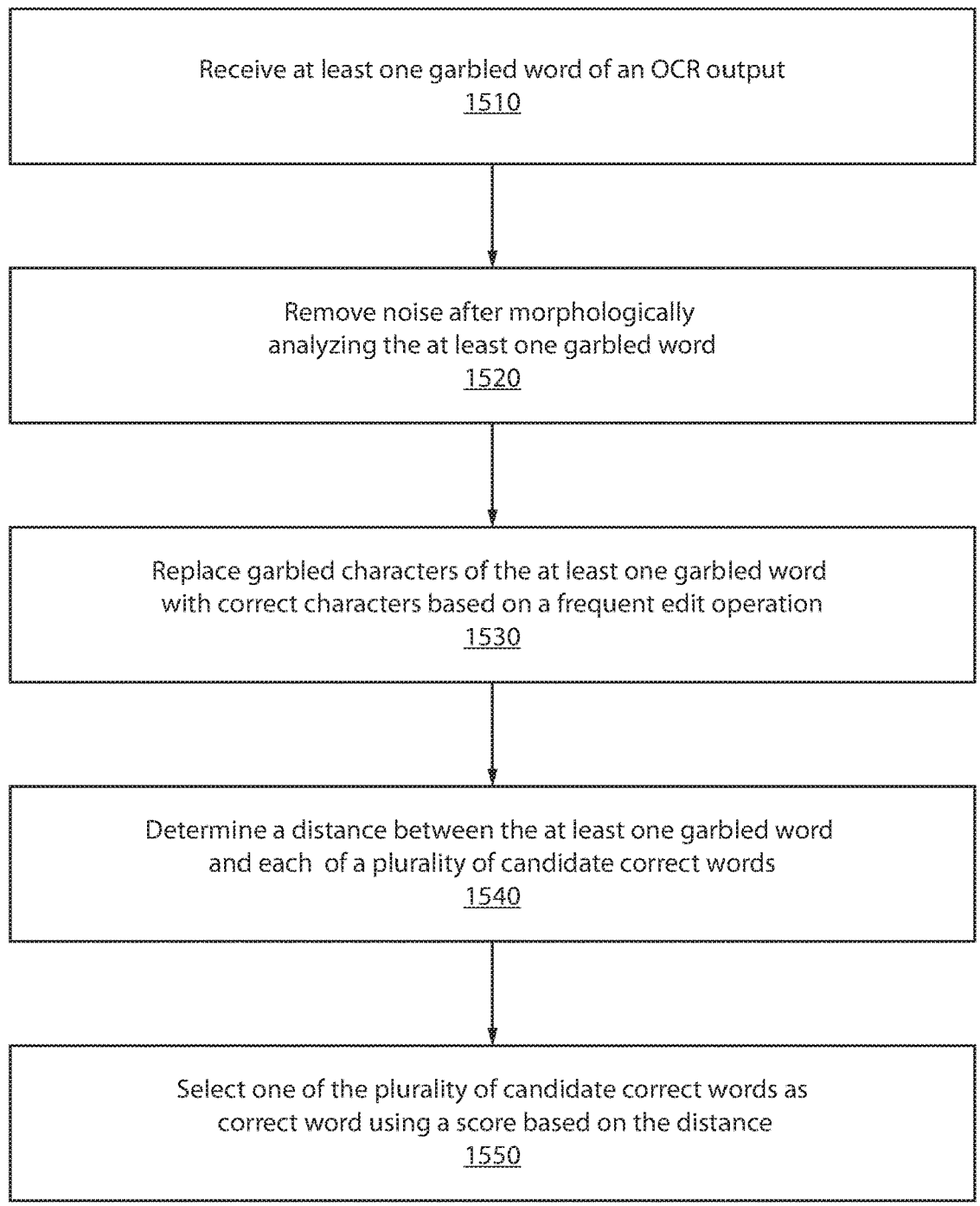
FIG. 15 is a flow diagram showing a method providing support for OCR, in accordance with an embodiment of the present invention.

FIG. 15 is a flow diagram showing a method for learning in an optical character recognition (OCR) support system to increase recognition rate of OCR system regarding word and number pair by replacing garbled words outputted by OCR system with the corrected words in accordance with an embodiment of the present invention.

At block 1510, OCR support system 100 receives at least one garbled word of an OCR output.

At block 1520, OCR support system 100 removes noise after morphologically analyzing the at least one garbled word.

At block 1530, OCR support system 100 replaces garbled characters of the at least one garbled word with correct characters based on a frequent edit operation.

At block 1540, OCR support system 100 determines a distance between the at least one garbled word and each of a plurality of candidate correct words.

At block 1550, OCR support system 100 selects one of the plurality of candidate correct words as correct word using a score based on the distance. OCR support system 100 can weight these distances and make determinations based on machine learning results, and select one candidate correct word which yields best score (based on a weighted combination of factors).

According to example embodiment, at block 1560, OCR support system 100 can also calculate edit (Levenshtein) distance, determine image distance (for example, cosine distance regarding letters as binary images and superimposing the letters as images taking depth of images into consideration), determine a number of same characters (for example, letters), and determine a number of candidate words used in the past, all between the garbled word and the candidate for the correct word.

OCR support system 100 increases a recognition rate of OCR system based on a combination of pre-processing and post-processing of the images. The pre-process procedure can be determined based on the results of pre-process, OCR, and post-process. The OCR support system 100 determines whether pre-process and OCR can find the correct answers (words). If pre-process (as described with respect to FIG. 14, flow diagram 1400) and OCR cannot find the correct answers, OCR support system 100 can determine the correct answers after post-process (as described with respect to FIG. 15, flow diagram 1500). Additionally, pre-processing and post-processing can be performed independently. For example, in some embodiments OCR support system 100 can skip pre-processing and just apply post-processing.

Referring now to FIG. 16, there is shown a pre-processing table 1600 including word areas, according to example embodiments.

As shown in FIG. 16, Mi (1610) is the area of each word (i=1 to 13 in this example). P is the median (length) of continuous word area for y-direction (vertical direction). For example, median of length of M1, . . . , M13. Q (1620) is the median (length) of noncontinuous word area for ydirection (vertical direction). For example, median of length between M1 and M2, M2 and M3, . . . , M12 and M13, in this area.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for learning in an optical character recognition (OCR) support system to increase recognition rate of OCR system regarding word and number pair by adding auxiliary lines (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for increasing a recognition rate of an optical character recognition (OCR) system, comprising:
   receiving at least one image;
   extracting all vertical lines from the at least one image;
   adding vertical lines at character areas;
   extracting, by a processor device, all horizontal lines from the at least one image;
   creating an unlined image removing all the vertical lines and horizontal lines from the at least one image;
   determining, by the processor device, a border of a vertical direction of the unlined image based on the total of pixels of rows in each column; and
   adding vertical auxiliary lines in blank space between characters of the unlined image.

2. The method of claim 1, further comprising:
   adding horizontal auxiliary lines.

3. The method of claim 1, further comprising:
   dividing the at least one image into blocks;
   determining whether the vertical auxiliary lines or the horizontal auxiliary lines overwrite the blocks;
   skipping adding of the vertical auxiliary lines or the horizontal auxiliary lines if they overwrite the blocks, and
   shifting a location of at least one of the vertical auxiliary lines and the horizontal auxiliary lines so that the at least one of the vertical auxiliary lines and the horizontal auxiliary lines is not overwritten.

4. The method of claim 1, further comprising:
   removing noise from the at least one image by applying morphological analysis.

5. The method of claim 1, further comprising:
   measuring a similarity between two words by converting the two words to images; and superimposing the images.

6. A computer-implemented method for increasing a recognition rate of an optical character recognition (OCR) system, comprising:
   receiving at least one garbled word of an OCR output;
   removing noise after morphologically analyzing the at least one garbled word; and
   replacing garbled characters of the at least one garbled word with correct characters based on a frequent edit operation;
   determining a distance between the at least one garbled word and each of a plurality of candidate correct words; and
   selecting one of the plurality of candidate correct words as correct word using a score based on the distance.

7. The method of claim 6, wherein determining the distance between the at least one garbled word and each of a plurality of candidate correct words further comprises:
   measuring a similarity between two words by measuring an edit distance of the two words.

8. The method of claim 6, wherein determining the distance between the at least one garbled word and each of a plurality of candidate correct words further comprises:
   measuring a similarity between two words by measuring an edit distance of the two words.

9. The method of claim 6, further comprising:
   measuring a similarity between two words by converting the two words to images; and
   superimposing the images.

10. The method of claim 6, further comprising
    determining weighting for at least two post-process accuracy evaluators based on machine learning.

11. The method of claim 6, further comprising
    selecting a pre-process procedure based on at least one result of a pre-process procedure, an OCR procedure, and a post-process procedure.

12. The method of claim 6, further comprising:
    determining at least one of a frequency with which a candidate correct word has been used, a number of same letters in a garbled word and a candidate correct word, a number of same characters, and a number of times a candidate correct word was previously used.

13. A system for increasing a recognition rate of an optical character recognition (OCR) system, comprising:
    a memory device for storing program code; and
    at least one processor device operatively coupled to the memory device and configured to execute program code stored on the memory device to:
    receive at least one image;
    extract all vertical lines from the at least one image;
    add vertical lines at character areas;
    extract all horizontal lines from the at least one image;
    create an unlined image removing all the vertical lines and horizontal lines from the at least one image;
    determine a border of a vertical direction of the unlined image based on the total of pixels of rows in each column; and
    add vertical auxiliary lines in blank space between characters of the unlined image.

14. The system of claim 13, wherein the at least one processor device is further configured to execute program code stored on the memory device to:
    receive at least one garbled word of an OCR output;
    remove noise after morphologically analyzing the at least one garbled word; and
    replace garbled characters of the at least one garbled word with correct characters based on a frequent edit operation;
    determine a distance between the at least one garbled word and each of a plurality of candidate correct words; and
    select one of the plurality of candidate correct words as correct word using a score based on the distance.

15. The system of claim 13, wherein the at least one processor device is further configured to execute program code stored on the memory device to:
    remove noise from the at least one image by applying morphological analysis.

16. The system of claim 13, wherein the at least one processor device is further configured to execute program code stored on the memory device to:
    measure a similarity between two words by converting the two words to images; and superimposing the images.

17. The system of claim 15, wherein the at least one processor device is further configured to execute program code stored on the memory device to:
    take a depth of the images into consideration at superimposing.

18. The system of claim 13, wherein the at least one processor device is further configured to execute program code stored on the memory device to:
    select a pre-process procedure based on at least one result of a pre-process procedure, an OCR procedure, and post-process procedure.

* * * * *